United States Patent [19]
Kroon

[11] Patent Number: 5,841,458
[45] Date of Patent: Nov. 24, 1998

[54] HALFTONING METHOD FOR MULTI-COLOR LASER PRINTER

[75] Inventor: Stephen M. Kroon, Sherwood, Oreg.

[73] Assignee: Tektronix, Inc., Wilsonville, Oreg.

[21] Appl. No.: 655,018

[22] Filed: May 28, 1996

[51] Int. Cl.⁶ .................................................. B41J 2/47
[52] U.S. Cl. .......................... 347/131; 347/240; 347/115; 347/232
[58] Field of Search ..................................... 347/115, 232, 347/131, 240, 257, 153; 430/119, 126; 399/307, 180, 181, 298

[56] References Cited

U.S. PATENT DOCUMENTS 5,650,253   7/1997   Baker et al. ............................ 430/119

Primary Examiner—Mark J. Reinhart
Attorney, Agent, or Firm—Ralph D'Alessandro; Paul S. Angello

[57] ABSTRACT

A halftoning method characterized by two nonaligned halftone screens, one for black and the other for the subtractive primary colors cyan, magenta, and yellow, produces multi-color images on a color laser printer. The black screen is the inverse of, i.e., in reverse fill order to, the subtractive primary colors screen. The halftone pattern is a vertical line screen. In a preferred embodiment, the cells are grouped on hexagonal centers and aligned along X and Y coordinate axes. The dots are grouped in the linear direction of print medium motion. The grouping of dots reduces the effect of halftone screen misregistration, and the cell alignment in X and Y results in fewer high frequency artifacts. Inverting the black screen increases the number of possible chromatic mixed colors that include black, increases color uniformity and reduces the frequency of white "holes" in the printed images.

6 Claims, 4 Drawing Sheets

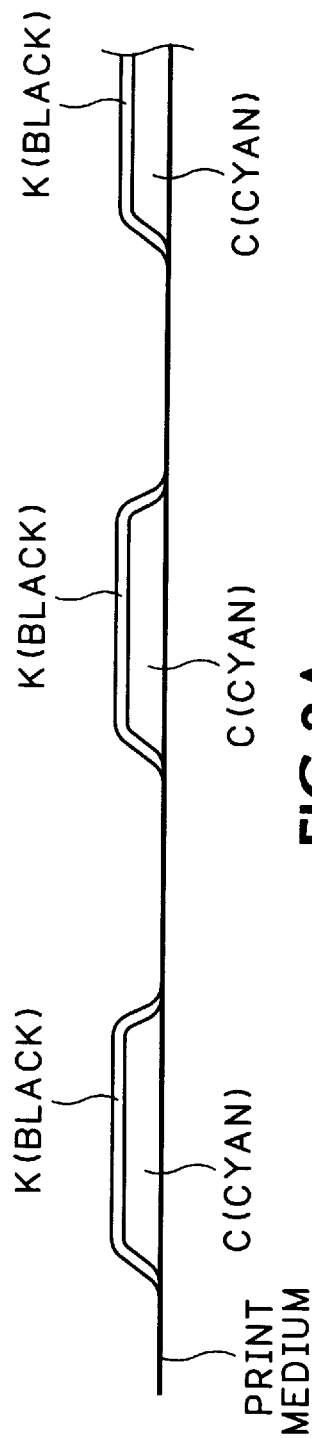
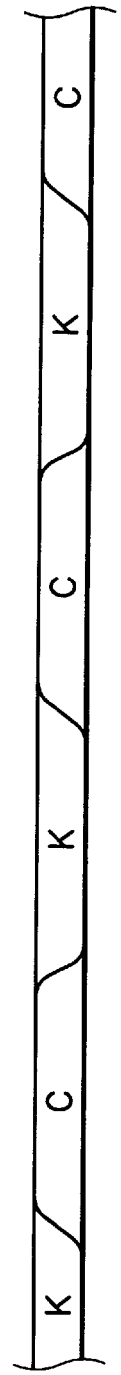
FIG. 2A (PRIOR ART)
FIG. 2B

FIG.3

HALFTONING METHOD FOR MULTI-COLOR LASER PRINTER

TECHNICAL FIELD

The present invention relates to multi-color laser printers and, in particular, to a method of creating a halftone pattern with nonaligned primary color halftone screens and the use of a color laser printer to synthesize a multi-color image having rich, saturated colors.

BACKGROUND OF THE INVENTION

Color laser printers implement an electrophotographic process for recording and registering a multi-color image on an electrophotographic surface or a print medium, such as paper. Image data representing each primary color plane and generated in a personal computer are sent to the laser printer, which converts the image data to binary electrical signals that represent the dots forming the image. Each of the binary signals represents either a light or dark state of one dot in the image pattern. Depending on the state of each dot, the binary signals modulate a laser beam either ON or OFF as it is directed to an electrically charged light sensitive surface of a drum, which records the image pattern. A spinning multifaceted mirror scans the modulated laser beam in raster fashion along the length of the drum, and the drum incrementally rotates about its longitudinal axis by one dot position so that each successive scan of the laser beam is recorded in proper registration immediately after the previous scan.

The laser beam strikes and electrically discharges areas of the light sensitive drum to produce a latent electrostatic image on the drum surface. After it is scanned, the drum surface is positioned near a developing toner source, which is typically an electrically biased roller, to repel toner and thereby transfer it to the drum surface to form a pattern that represents the image. The toner is then transferred in accordance with an electrostatic process from the drum surface to the print medium.

A multi-color laser printer develops successive images by using developing toners of different colors supplied from corresponding toner sources. Color printing is typically done with the substractive primary colors cyan, magenta, and yellow and with black. All of these colors are applied in registration during successive rotations of the drum before transfer of the toner to the print medium. Heat is usually applied to permanently fuse the image to the print medium to form a finished multi-color image.

Many printers include a control software driver program (hereafter "printer driver") for handling various aspects of the printer operation. Such printer drivers are often interfaced to a computer programming language known as PostScript®, which is available from Adobe Systems Inc., Mountain View, Calif. The PostScript® language, described in the PostScript® Language Reference Manual, Second Edition, 1990, Addison-Wesley Publishing Co., Reading, Massachusetts, includes methods for manipulating text and graphics, selecting media sizes, types, trays, and the number of copies to be printed.

For each primary color plane, a color laser printer typically produces on a print medium dots sized to provide "solid fill" printing at a given resolution, such as 300 dots per inch ("dpi") 12 dots per millimeter ("dpm"). Single dot size printing is acceptable for most test and graphics printing applications not requiring "photographic" image quality. Photographic image quality normally requires a combination of high dot-resolution and an ability to modulate a reflectance (i.e., gray scale) of dots forming the image.

In single dot size printing, average reflectance of a region of an image is typically modulated by a process referred to as "dithering" in which the perceived intensity of an array of dots is modulated by selectively printing the array at a predetermined dot density. For example, if a 50 percent local average reflectance is desired, half of the dots in the array are printed.

An image is formed by the tessellation of multiple cells or "tiles," which are clusters of dots or pixels arranged in a predetermined pattern. Each cell has the same number of pixel locations arranged in the same pattern. The number of pixels filled in a cell determines its darkness, and there is a specified "fill order" for darkening certain pixels in a cell as its darkness increases. The number of pixels selected for a cell presents a tradeoff between the resolution and number of available gray levels of the resulting image. A greater number of pixels reduces image resolution but increases the number of available gray levels. Replication of tessellated cells of varying darknesses form the printed image.

Conventional halftoning techniques for multi-color laser printers develop either diffuse dot or clustered dot patterns. Each of these techniques forms a multi-color image by means of aligned color halftone planes.

Problems with images produced by multi-color laser printers developing halftone cells using conventional prior art halftone pattern fill order techniques include registration variations within a page primarily in the direction of print medium motion, reduced chroma and washed out mixed colors, and streaks and high frequency artifacts in colors mixed with black.

SUMMARY OF THE INVENTION

An object of this invention is, therefore, to provide with the use of a color laser printer a halftoning method in the synthesis of a multi-color printed image having rich, saturated colors.

Another object of this invention is reduced perception of registration variations within a page of a multi-color image in the direction of print medium motion.

A further object of this invention is increased chroma and reduced washout of mixed colors in a multi-color printed image.

Still another object of this invention is the production of multi-color printed images with fewer streaks and high frequency artifacts in colors mixed with black.

The present invention produces multi-color images through the use of a halftoning method characterized by two nonaligned halftone screens, one for black and the other for the subtractive primary colors cyan, magenta, and yellow. The halftone screens are nonaligned in that the black screen is the inverse of (i.e., in reverse fill order to) the subtractive primary colors screen. The first pixel to be darkened in the subtractive primary color screen is the last to be darkened in the black screen. The halftone pattern is a vertical line screen. In a preferred embodiment, the cells are grouped on hexagonal centers and aligned along X and Y coordinate axes. The dots are grouped in the linear direction of print medium motion. This grouping of the dots reduces the effect of halftone screen misregistration, and the cell alignment along the X- and Y-axes results in fewer high frequency artifacts.

Inverting the black screen has several benefits. The first of these includes an increased number of possible chromatic mixed colors that include black because the overlap of black and other colors is minimized. Moreover, the reduced overlap resulting from the inverted black screen increases color uniformity because multiple layers of colors are inherently less uniform than a single layer. Another benefit is that the halftoning method reduces the frequency of white "holes" in the printed image, the white holes representing sites where no colorant is placed. Finally, because the black screen is the inverse of the subtractive primary colors screen, black substitution, which is the replacement of composite black (a mixture of cyan, magenta, and yellow), with true black is decreased. This can slightly increase the printer color gamut near black.

BRIEF DESCRIPTION OF THE DRAWINGS

FIGS. 2A and 2B are sectional views of print media illustrating toned regions produced by the spot fill order of subtractive color and black line screens of, respectively, the prior art and the present invention.

FIG. 3 shows a hexagonal super-cell structure of and a preferred spot growth visitation order for an array of nine halftone cells of the type shown in FIG. 1A that form a line screen in accordance with the present invention.

DETAILED DESCRIPTION OF PREFERRED EMBODIMENTS

Figure 1B:
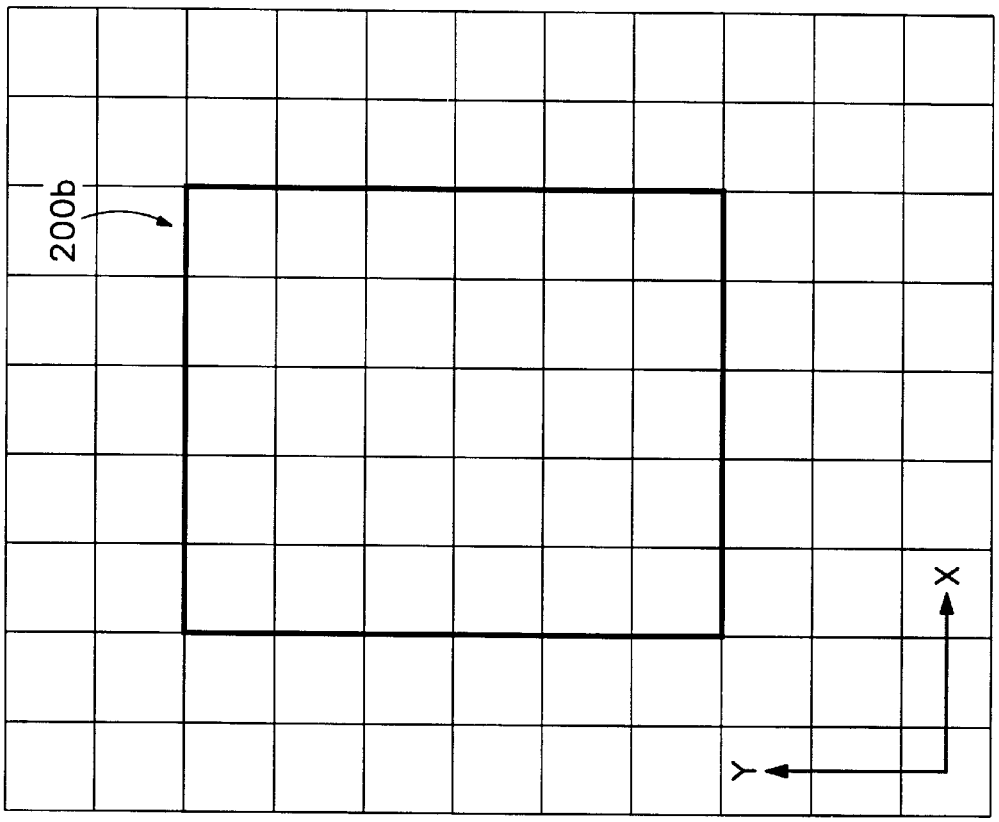
FIGS. 1A and 1B show a preferred linear halftone cells of the invention for, respectively, a subtractive color screen and a black screen.
Figure 1A:
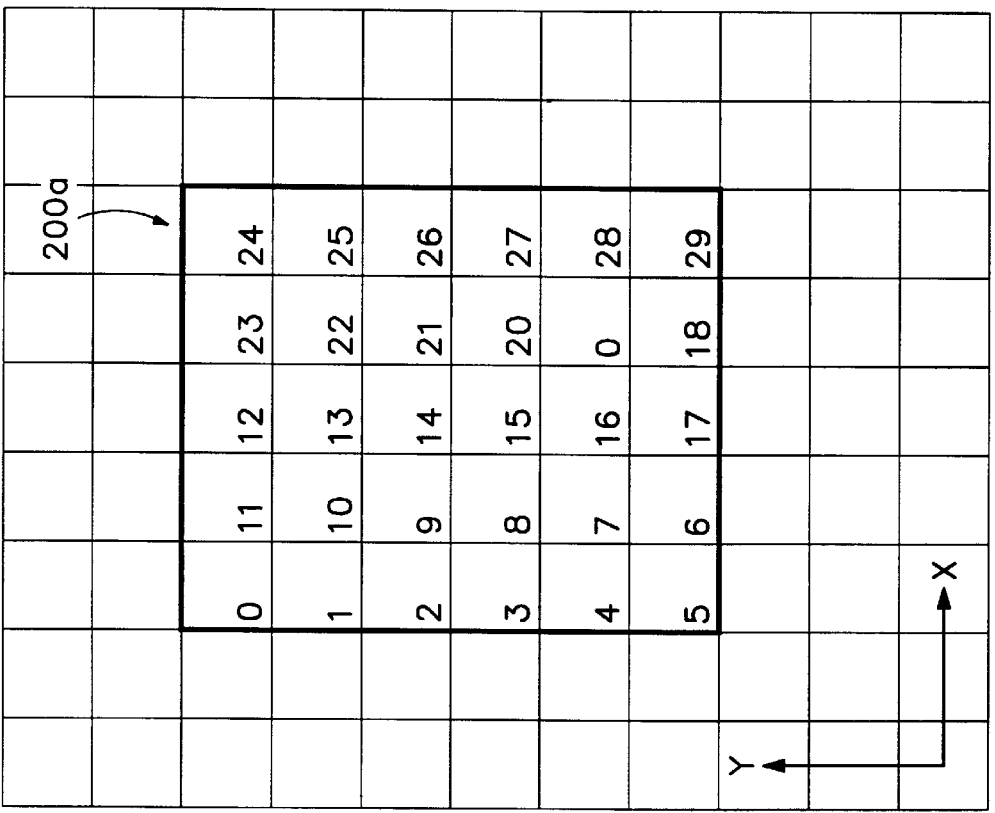

FIGS. 1A and 1B show respective 6×5 pixel halftone cells 200a and 200b used to create a halftone pattern geometry on a 600×600 dpi (24×24 dpm) grid in accordance with the invention. Cell 200a represents a subtractive color line screen, and cell 200b represents a black line screen. Each of cells 200a and 200b includes 30 pixels. In FIGS. 1A and 1B, the rectangular pixels in each line screen are consecutively numbered from 0 to 29 to indicate a zig-zag spot growth as pixels are progressively darkened to achieve a perceived monotonic darkening of cells 200a and 200b. The zig-zag spot growth pattern creates a progressively widening line as successive pixels are filled. This fill order arrangement in the halftone cell characterizes a "line screen." Each color plane of cyan, magenta, and yellow tracks the line screen fill order shown in FIG. 1A; and the black color plane tracks the line screen fill order shown in FIG. 1B.

The order of darkening the pixels to cause progressively widening lines is called "spot fill order." The spot fill order of cell 200a is the inverse, i.e., in reverse order, of that of cell 200b. The spot filling process of each cell 200a and 200b entails progressively darkening pixels in an alternating sequence for adjacent columns of pixels, the alternating sequence entailing pixel darkening consecutively from the top pixel to the bottom pixel in one column and from the bottom pixel to the top pixel in an adjacent column to form a zig-zag spot growth pattern. This is the spot fill order shown in FIGS. 1A and 1B, with pixels 0 and 29 representing the terminal pixels. The spot fill orders of cells 200a and 200b differ in that one is the reverse of the other.

For cell 200a, darkening starts with a terminal pixel 0 in the upper left-hand corner and proceeds in zig-zag fashion to terminal pixel 29 in the lower right-hand corner. Thus, for cell 200a, a zig-zag spot growth pattern starts from terminal pixel 0 in the upper left-hand corner and moves in a straight line path down to pixel 5, moves horizontally one pixel to the right and in a straight line path up to pixel 11, moves horizontally one pixel to the right and in a straight line path from pixel 12 down to pixel 17, moves horizontally one pixel to the right and in a straight line path up to pixel 23, moves horizontally one pixel to the right and in a straight line path from pixel 24 down to terminal pixel 29 in the lower right-hand corner.

For cell 200b, darkening starts with a terminal pixel 0 in the lower right-hand corner and proceeds in reverse zig-zag fashion as compared with cell 200a to terminal pixel 29 in the upper left-hand corner. The alternating sequence is in reverse order to that described in detail above for cell 200a.

FIGS. 2A and 2B are sectional views of print media illustrating toned regions produced by the spot fill order of subtractive color and black line screens of, respectively, the prior art and the present invention. FIG. 2A shows the superposition of black on cyan in this illustration. (The darkest color is typically positioned as the top toner layer because inks tend to be transmissive.) The overlap of black and cyan causes a contribution of white from the print medium (which is typically white) that the viewer's eye needs to overcome to integrate the colors presented. FIG. 2B shows that the reverse fill order of the present invention minimizes the overlap of black and cyan and therefore allows the visual integration of cyan adjacent to black without having to overcome the presence of white.

The reverse fill order provides, with the use of multiple color planes, color uniformity and richer, more saturated colors because mixtures of the subtractive primary colors cyan, magenta, and yellow are not overwhelmed by the presence of black in the same fill order. Moreover, a greater number of chromatic mixed colors that include black is possible because the overlap of black and other colors is minimized.

Halftoning has traditionally been achieved by a rectangular grid of cells. In the embodiment described below, the halftone pattern is a vertical line screen with cells grouped on hexagonal centers and aligned in an X-Y coordinate axis system. The pattern is aligned in X and Y to minimize interference patterns between the halftone and high frequency artifacts of the laser printing process. A hexagonal grid is preferable to a rectangular grid because the latter grid aligned in X and Y would produce conspicuous halftoning artifacts. The hexagonal grid avoids the horizontal components of such halftoning artifacts.

Figure 3:
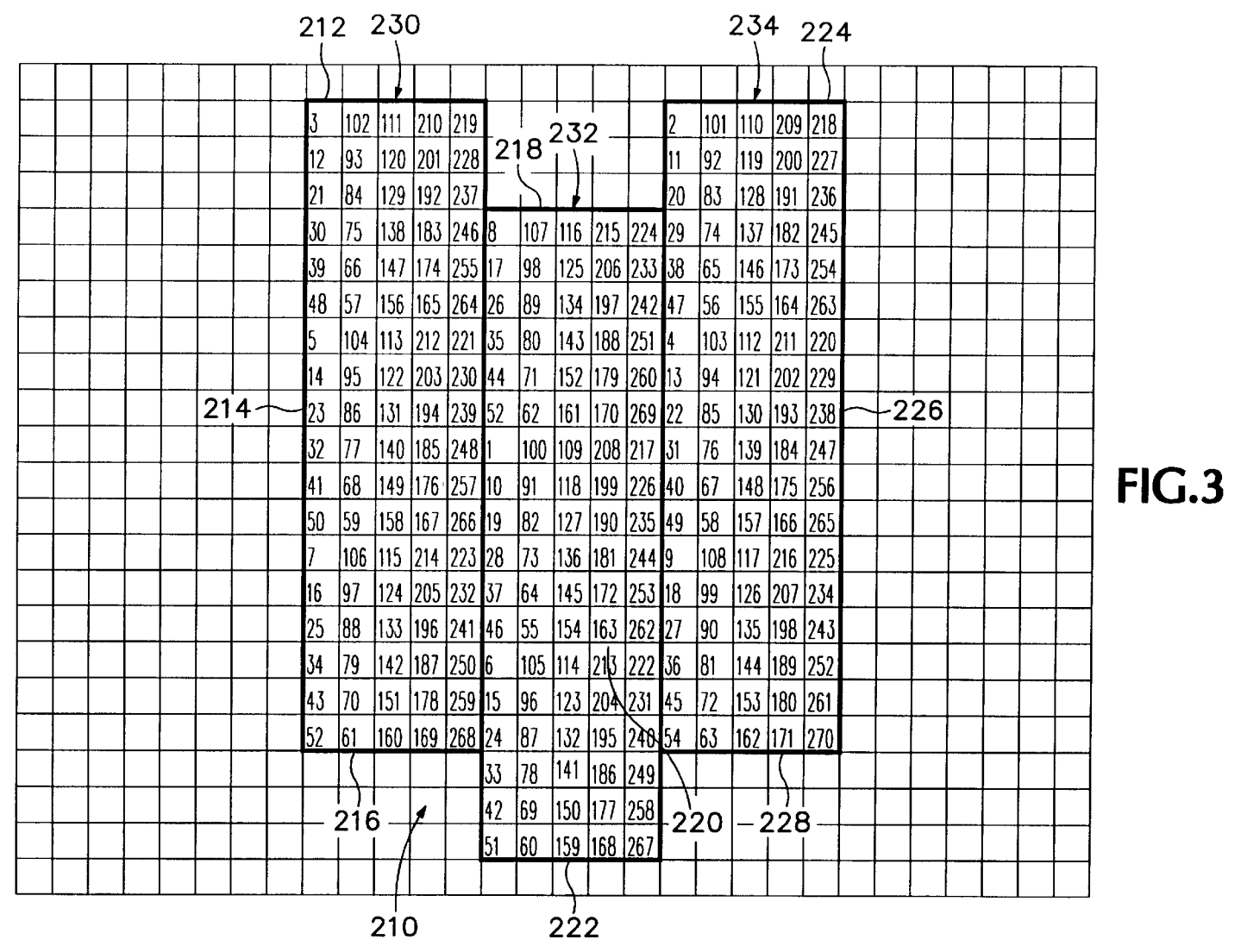

To increase the number of perceivable gray scale levels, a group of cells 200a is assembled in a super-cell structure. FIG. 3 shows a hexagonal super-cell 210 comprised of nine halftone cells of the type shown in FIG. 2A for the subtractive primary color screen. The super-cell for the black screen is the same except that the spot fill order is the reverse of that indicated.

With reference to FIG. 3, cells 212, 216, 218; cells 220, 222, and 224; and cells 226, 228, and 214 are positioned in respective vertical columns 230, 232, and 234 aligned in the Y-axis direction, which is the direction of print medium motion. Center column 232 is displaced by three pixel locations downwardly in the Y-axis direction so that cell 220 is the only cell in super-cell 210 all of whose pixels are contiguous to other pixels forming the super-cell. The offset of the cells in center column 232 makes pixels located at the boundaries of cells other than cell 220 open and available to contact pixels of another super-cell structure to form an interdigitated tessellation pattern, which is described below with reference to FIG. 4.

In FIG. 3, the pixels are numbered from 0 to 270 to represent the visitation order defined by the repetition of a sequence of darkening pixels in super-cell structure 210. The preferred darkening order sequence entails darkening a pixel in each of the cells of super-cell structure 210 before darkening another pixel in a cell before completion of the sequence. Thus, each cell is within one gray scale level of every other cell in super-cell structure 210. The visitation order results in spatially asymmetric spot growth in each of the nine cells, as was described above with reference to FIGS. 1A and 1B. The visitation order of super-cell 210 permits, therefore, halftoning among halftone cells to achieve the desired number of tint or gray scale levels.

The embodiment uses a super-cell tile structure of the form $$\begin{matrix} 3 & & 2 \\ & 8 & \\ 5 & & 4 \\ & 1 & \\ 7 & & 9 \\ & 6 & \end{matrix}$$

in which the numbers indicate the darkening order sequence for the nine cells in the super-cell structure. The halftone pattern is a vertical line screen with cells grouped on hexagonal centers and aligned along X and Y coordinate axes. The dots are grouped in the linear direction of print medium motion. The grouping of the dots reduces the effect of halftone screen misregistration, and the cell alignment along the X- and Y-axes results in fewer high frequency artifacts. The nine level super-cell pattern built on a 30 pixel-based cell provides 9×30+1=271 tint or gray scale levels for each color plane. Skilled persons will appreciate that a super-cell structure may include different numbers of cells and cells having different numbers of pixels from those described for super-cell structure 210.

Figure 4:
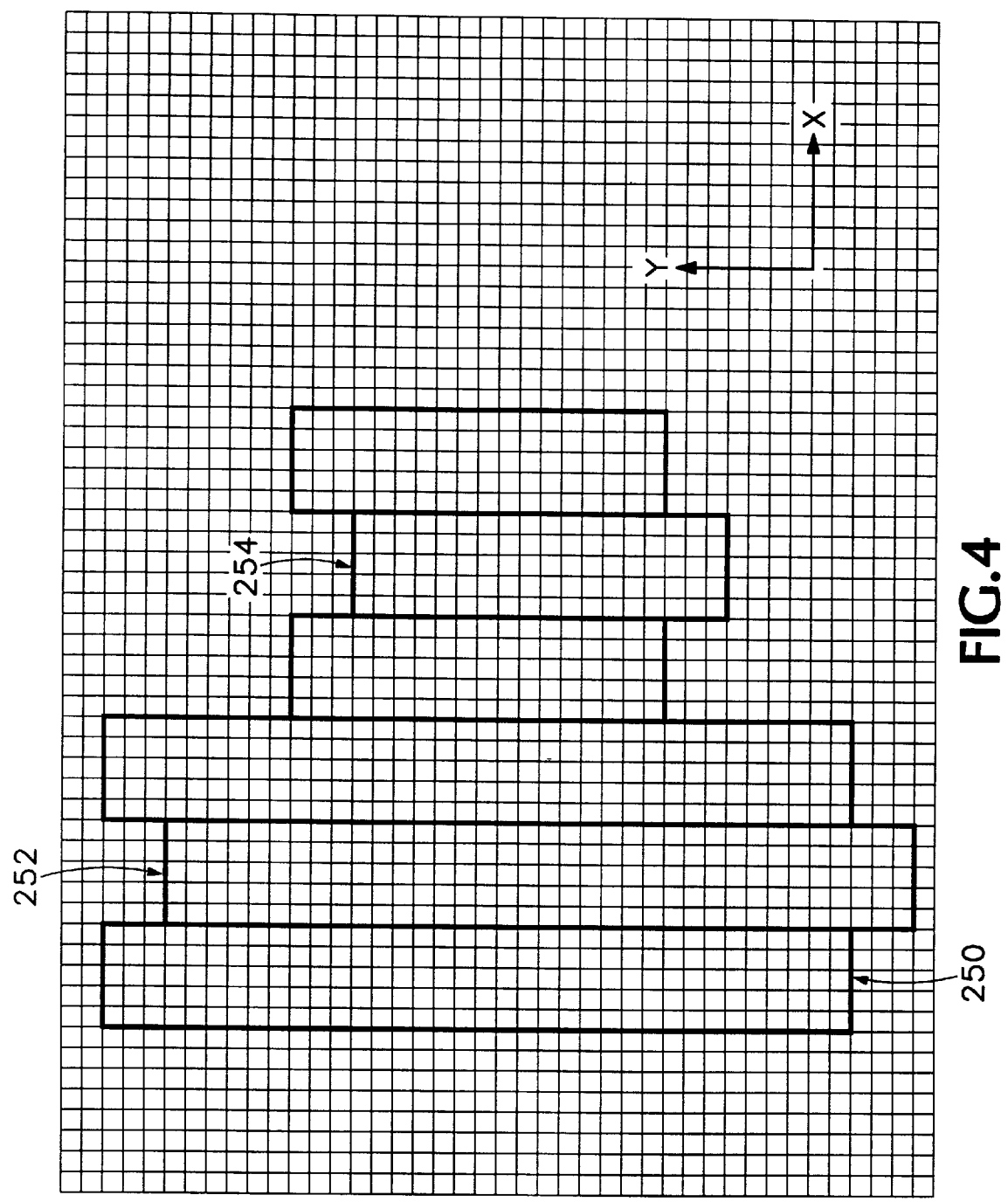
FIG. 4 shows the relative positioning of three super-cell structures of FIG. 3 to define a preferred super-cell interdigitated tessellation geometry.

FIG. 4 shows the relative positioning of three super-cell structures 210 that define an interdigitated super-cell tessellation geometry that is replicated to tile the plane.

With reference to FIG. 4, super-cell structures 250, 252, and 254 each have opposed super-cell extreme boundaries, each of which is defined by the length of a halftone cell. The super-cell structures are tessellated to form a super-cell pattern characterized in that the offset pixels in the center column of super-cell structure 252 are positioned between the columns forming the side boundaries of super-cell structure 250. Super-cell structure 254, which does not interlock with super-cell structures 250 and 252, is positioned adjacent the side boundaries of super-cell structures 250 and 254 and overlaps an equal number of their pixels.

It will be obvious to those having skill in the art that many changes may be made to the details of the above-described embodiments of this invention without departing from the underlying principles thereof. Accordingly, it will be appreciated that this invention is also applicable to printing applications other than those found in the field of PostScript®-controlled color laser printing. The scope of the present invention should, therefore, be determined only by the following claims.

I claim:

1. In an electrophotographic imaging system, a method of creating a halftone pattern using nonaligned primary color halftone screens to synthesize a multi-color image having rich, saturated colors, comprising:

defining multiple color planes in a spatially aligned overlay, each one of the color planes corresponding to a different primary color and belonging to one of first and second different sets;

developing halftone cells for the color planes, each of the halftone cells having a first darkened pixel and a last darkened pixel at predetermined positions, each of the halftone cells in the first set of color planes having pixels designated for spot growth in a first spot fill order from the first to the last darkened pixels and in the second set of color planes having pixels designated for spot growth in a second spot fill order from the first to the last darkened pixels; and synthesizing the multi-color image by darkening the pixels of the halftone cells in each color plane belonging to the first set to achieve spot growth in the first spot fill order and darkening the pixels in the halftone cells in each color plane belonging to the second set of color planes having pixels to achieve spot growth in the second spot fill order that is the reverse of the first spot fill order.

2. The method of claim 1 in which the first set includes at least two subtractive primary colors and the second set includes black.

3. The method of claim 2 in which the two subtractive primary colors are selected from a group consisting of cyan, magenta, and yellow.

4. The method of claim 1 in which the first and second spot fill orders result in spot growth patterns that form a line screen pattern for each halftone cell.

5. The method of claim 1, further comprising arranging the halftone cells relative to one another in a group so that the first darkened pixels of the halftone cells in the group form a vertical line screen with the halftone cells grouped on hexagonal centers and aligned with an X-Y coordinate axis system, the vertical line screen reducing high frequency artifacts.

6. The method of claim 1 in which the darkening of halftone cells in each color plane is performed on a print medium by a laser beam scanning in a scan direction, the print medium and the scanning laser beam moving relative to each other in a print direction that is transverse to the scan direction, the method further comprising arranging the halftone cells relative to one another in a group so that the first darkened pixels of the halftone cells in the group form a vertical line screen in which the darkened pixels are grouped in the print direction to reduce image degradation effects stemming from color plane halftone screen misregistration.

* * * * *